United States Patent Office 3,268,543
Patented August 23, 1966

3,268,543
MONOAZOLYL-THIOPHENE DERIVATIVES
Adolf Emil Siegrist, Basel, Erwin Maeder, Aesch, Basel-Land, Peter Liechti, Binningen, Basel-Land, and Leonardo Guglielmetti, Basel, Switzerland, assignors to Ciba Limited, Basel, Switzerland, a Swiss company
No Drawing. Filed Nov. 27, 1963, Ser. No. 326,361
Claims priority, application Switzerland, Nov. 30, 1962, 14,106/62
15 Claims. (Cl. 260—304)

The present invention provides new, valuable monoazolyl-thiophene compounds of the general formula (1) 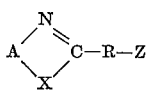

in which A represents a benzene or naphthalene radical of which two vicinal cyclic carbon atoms at the same time belong to the azole ring, X represents the complement to the azole ring and R a thiophene radical bound in position 2 to the azole ring and in position 5 to Z, and Z stands for a possibly functionally modified carboxyl group.

The new monoazolyl-thiophene compounds of the Formula 1 may be monooxazolyl-, monothiazolyl- or monoimidazolyl-thiophene compounds, that is to say that X in the Formula 1 may represent the complement to an oxazole, a thiazole or an imidazole ring.

From among the new monoazolyl-thiophene compounds of the above composition there may be mentioned, for example, those of the formula (2) 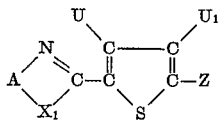

in which A represents a benzene or naphthalene radical of which two vicinal cyclic carbon atoms at the same time belong to the azole ring, $X_1$ represents the complement to an oxazole, a thiazole or an imidazole ring, U and $U_1$ are identical or different and each represents a hydrogen atom or a hydrocarbon radical with 1 to 7 carbon atoms, for example a methyl, ethyl, tertiary butyl, phenyl, tolyl, benzyl or cyclohexyl group, and Z stands for a possibly functionally modified carboxyl group.

The residue A in the Formulae 1 and 2 may be a naphthalene radical. Preferably, it represents a benzene radical which may contain further substituents such as alkyl, alkenyl or alkoxy groups, halogen atoms such as chlorine or fluorine, nitrile groups, cyanoalkyl, carbalkoxy, carboxyalkyl or carbalkoxyalkyl groups, phenyl groups, phenylalkyl groups, cycloalkyl or sulfonic acid groups.

In the Formulae 1 and 2 Z may represent a free or neutralized carboxyl group (—COO cation) or a functionally modified carboxyl group. Suitable functionally modified carboxyl groups are, for example, carboxylic acid halide groups, more especially the carboxylic acid chloride group, or carboxylic acid ester groups such as carboxylic acid alkyl ester groups, carboxylic acid alkenyl ester groups, carboxylic acid aryl ester and aralkyl ester groups, or the carboxylic acid nitrile group, carboxylic acid amide groups (—$CONH_2$ and amide groups carrying an organic substituent on the nitrogen atom) and carboxylic acid hydrazide groups (—CO—NH—$NH_2$ and hydrazide groups carrying an organic substituent on the nitrogen atom of the —$NH_2$ group).

Special mention among the new monoazolyl-thiophene compounds of the Formula 2 deserve those which correspond to the formula (3) 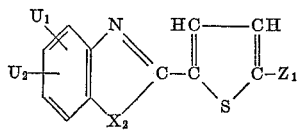

in which $U_1$ stands for a hydrogen atom or a halogen atom such as fluorine or chlorine, or a carboxylic acid alkyl ester group, an alkyl, phenyl, phenylalkyl or alkoxy group or a cycloalkyl group, $U_2$ stands for a hydrogen atom or a lower alkyl group, or $U_1$ and $U_2$ together with two vicinal carbon atoms of the benzene ring represent a six-membered alicycle, $X_2$ stands for an oxygen or sulfur atom and $Z_1$ for a free or neutralized carboxyl group, a carboxylic acid alkyl ester group, especially a carboxylic acid methyl ester group, a —CO—NH—$NH_2$ group or a group of the formula (4) 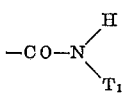

where $T_1$ represents a hydrogen atom or a phenyl group, and among these monoazolyl-thiophene compounds of the Formula 3 especially the monooxazolyl-thiophene compound of the formula (5) 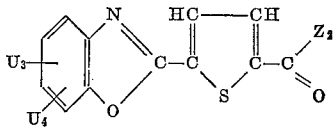

where $U_3$ stands for a hydrogen or chlorine atom, a carbomethoxy group, a lower alkoxy group with up to 4 carbon atoms, an alkyl group with up to 8 carbon atoms, a phenyl or phenyl-($C_1$—$C_4$)alkyl group or a cyclohexyl group, and $U_4$ stands for a hydrogen atom or a lower alkyl group with up to 4 carbon atoms, or $U_3$ and $U_4$ together with two vicinal carbon atoms of the benzene ring represent a six-membered alicycle, and $Z_2$ represents a hydroxyl group, an —O—($C_1$—$C_4$)—alkyl group, especially an —$OCH_3$ group, an —$NH_2$ group, an

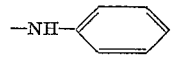

group or an —NH—$NH_2$ group.

The new monoazolyl-thiophene compounds of the general formula (1) 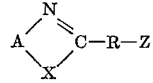

where A, X, R and Z have the above meanings can be manufactured, for example, by reacting a thiophene-mono-carboxylic acid halide, especially a thiophene-mono-carboxylic acid chloride, of the formula (6) 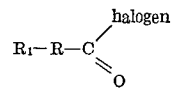

in which $R_1$ represents a lower carboxylic acid alkyl ester group, more especially a carboxylic acid methyl ester group, and R stands for a thiophene radical bound in position 2 with the carboxylic acid halide group and in position 5 with R₁ with an ortho-amino compound of the formula (7) 

in which A stands for a benzene or naphthalene radical to which X₄ and —NH₂ are linked in vicinal positions, and X₄ stands for a hydroxyl or mercapto group or a primary or secondary amino group—and if desired in the resulting monoazolyl-thiophene compound the lower carboxylic acid alkyl ester group (R₁), especially a carboxylic acid methyl ester group, which is bound with the thiophene radical, is hydrolyzed to the carboxyl group or converted into another carboxylic acid ester group or into another functionally modified carboxyl group. If desired, the reaction of the thiophene-monocarboxylic acid halide of the Formula 6 with the ortho-amino compound of the Formula 7 leading to the monoazolyl-thiophene compounds of the composition defined above may be performed in two stages: In the first stage the thiophene-monocarboxylic acid halide is condensed at an elevated temperature within the range of about 100 to 200° C. in the presence of an inert organic solvent (such as toluene, a xylene, ortho-dichlorobenzene or especially chlorobenzene) with the ortho-amino compound to form an acyl compound of the formula (8) 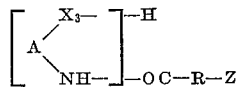

in which A, R and Z have the above meanings and X₃ represents an oxygen or sulfur atom, or an —NH-group or the radical of a secondary amino group—whereupon this acyl compound, if desired after first having been isolated, is converted into a monoazolyl-thiophene compound by heating at about 150 to 300° C. in the presence of a water-eliminating agent such as zinc chloride or especially boric acid. When in the second stage of the process boric acid is used as water-eliminating agent, it is of advantage to use about 0.5 to 5% thereof, referred to the weight of the reaction mixture as a whole. In this reaction it is of advantage to use concomitantly a high-boiling, polar, organic solvent such as an aliphatic, possibly etherified, hydroxy compound, for example propyleneglycol, ethyleneglycol monoethyl ether or especially diethyleneglycol diethyl ether. Monoazolyl - thiophene compounds of the Formula 1 can also be obtained by simply melting the isolated acyl compounds of the Formula 8 in the presence of boric acid.

The thiophene-monocarboxylic acid halides of the Formula 6 to be used as starting materials in the present process are either known or can be prepared by known methods, for example by reacting thionyl chloride upon the monoethyl or especially monomethyl ester of, for example, thiophene - 2:5 - dicarboxylic acid, or 3:4-dimethyl-thiophene-2:5-dicarboxylic acid or of 3:4-diphenyl-thiophene-2:5-dicarboxylic acid. A particularly suitable thiophene-monocarboxylic acid halide is, for example, the known acid chloride of the formula (9) 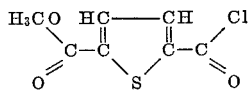

As further starting materials for use in the present process described above there are used ortho-amino compounds of the Formula 7, namely in the case of the mono-imidazolyl-thiophene compounds especially ortho-diamines of the benzene series of which one amino group is primary and the other primary or secondary, for example 1:2-diaminobenzene, 1-amino-2-monomethylaminobenzene, 1-methyl-3:4-diamino-benzene, 3:4-diamino-1:2 - dimethylbenzene, 1 - methoxy-3:4-diaminobenzene, isopropyl - ortho - phenylenediamine or 1-chloro-3:4-diaminobenzene. In the case of the monoöxazolyl-thiophene compounds there are suitable as further starting materials, for example, 1 - amino-2-hydroxynaphthalene, 1 - hydroxy - 2 - aminobenzene and 1 -hydroxy-2-amino-methylbenzenes such as 1-hydroxy-2-amino-4- or 5-methylbenzene, also 1 - amino-2-hydroxy-5-methoxybenzene, 1 - amino - 2 - hydroxy - 5-tertiary butylbenzene, 1-amino-2-hydroxy-5-octylbenzene of the formula

(10) 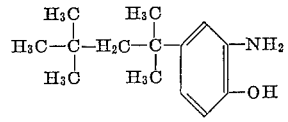

1-amino-2-hydroxy - 5 - dodecylbenzene, 1-amino-2-hydroxy-5-fluorobenzene, 1 - amino-2-hydroxy-4:5-dimethylbenzene, 1 - amino - 2 - hydroxy-5-phenylbenzene and 1-amino-2-hydroxy-5-cyclohexylbenzene, and in the case of the monothiazolyl-thiophene compounds, for example, 1-amino-2-mercaptobenzene.

Monoazolyl-thiophene compounds of the general Formula 1 are also obtained by reacting a thiophene-mono-carboxylic acid of the formula

(11) 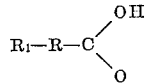

in which R₁ represents a lower carboxylic acid alkyl ester group, especially a carboxylic acid methyl ester group, and R represents a thiophene radical bound in position 2 with the carboxyl group and in position 5 with R₁—at a temperature ranging from about 150 to 300° C. in the presence of a water-eliminating agent, especially boric acid, and if desired of a high-boiling, polar organic solvent (for example propyleneglycol, ethyleneglycol monoethyl ether or especially diethyleneglycol diethyl ether) with an ortho-amino compound of the Formula 7 and, if desired, hydrolyzing in the monoazolyl-thiophene compound the lower carboxylic acid alkyl ester group (R₁), more especially the carboxylic acid methyl ester group, bound with the thiophene radical, to the carboxyl group or converting it into another carboxylic acid ester group or into another functionally modified carboxyl group.

As mentioned above, the lower carboxylic acid alkyl ester group, especially carboxylic acid methyl ester group [cf. R₁ in the Formulae 6 and 11] bound with the thiophene radical in the monoazolyl-thiophene compounds may be hydrolyzed to the carboxyl group or converted into another carboxylic acid ester group or into another functionally modified carboxyl group.

The hydrolysis of the lower carboxylic acid alkyl ester group to the carboxyl group and the conversion of this ester group into another carboxylic acid ester group or other functionally modified carboxyl group follow the usual practice. Thus, for example, the carboxyl group can be esterified with an organic hydroxy compound, especially with a primary aliphatic or araliphatic alcohol with up to 18 carbon atoms or with a phenol or naphthol, for example with ethanol, n-propanol, allyl alcohol, tertiary butanol, hexanol, 2-ethylbutanol, dodecyl alcohol, cetyl alcohol, oleyl alcohol, benzyl alcohol or a nuclear substitution product thereof such as para-tolylcarbinol, phenol or a nuclear substitution product thereof such as ortho-, meta- or para-chlorophenol, ortho-, meta- or para-cresol, para-tertiary butylphenol or para-dodecylphenol or with α-naphthol or β-naphthol; alternatively, the free carboxyl group can be converted with the aid of, for example, thionyl chloride, into a carboxylic acid chloride group which can then be converted into a carboxylic acid amide or hydrazide group with ammonia or with a primary or secondary amine, or with hydrazine or a substituted hydrazine in the known manner. As primary or secondary amines and substituted hydrazines there are particularly suitable those of the formula

(12) 

or of the formula

(13) 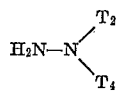

in which $T_2$ represents a hydrogen atom, an alkyl, monohydroxyalkyl or cycloalkyl group or an aryl or aralkyl radical, and $T_3$ stands for an alkyl, alkenyl or monohydroxyalkyl group, or $T_2$ and $T_3$ together with the nitrogen atom represents a saturated heterocycle, and $T_4$ stands for an alkyl or monohydroxyalkyl group, an aryl, aralkyl or aroyl radical such as benzoyl or sulfobenzoyl. The conversion of the free carboxyl group into a neutralized carboxyl group (for example an ammonium, alkali metal, alkaline earth metal or amine salt) is likewise carried out in the known manner.

According to another process for the manufacture of monoazolyl-thiophene compounds of the general Formula 1 a chloromethyl group is introduced in position 5 of the thiophene ring of a thiophene compound of the general formula

(14) 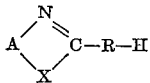

where A represents a benzene or naphthalene radical of which two vicinal cyclic carbon atoms at the same time belong to the azole ring, X represents the complement to the azole ring and R a thiophene radical bound in position 2 to the azole ring and in position 5 to hydrogen—by reaction with hydrogen chloride and formaldehyde or paraformaldehyde, or with dichloromethyl ether, whereupon in the monochloromethylated compound of the formula

(15) 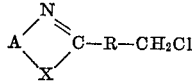

the chloromethyl group is hydrolyzed to the hydroxymethyl group, the latter is oxidized to the carboxyl group and, if desired, this carboxyl group is esterified or converted into another functionally modified carboxyl group.

The new monoazolyl-thiophene compounds of the general Formula 1 obtained according to this invention are valuable products which are suitable, for example, as intermediates for the manufacture of dyestuffs and of optical brighteners, as filters against ultraviolet rays, as scintillators, for various photographic purposes such as electrophotographic reproduction or for super-sensitizing photographic materials.

The new monoazolyl-thiophene compounds of the general Formula 1 obtained by the present process are above all, valuable optical brighteners suitable for optically brightening a wide variety of organic materials.

The application of the new brighteners may consist in impregnating the material to be brightened at an elevated temperature, ranging for example from 50 to 100° C., with a solution, preferably an aqueous solution, or a dispersion of the compound, whereupon the impregnated material is centrifuged or squeezed and then dried. Apart from the said aqueous solutions there may also be used for the improvement according to the invention solutions in organic solvents. It is also possible to treat the material with the new compounds in a dispersed form, for example with dispersions prepared with dispersing agents such as soaps, soap-like substances, polyglycol ethers of fatty alcohols, sulfite cellulose waste liquor or with formaldehyde condensation products of possibly alkylated naphthalenesulfonic acids.

Furthermore, the new monoazolyl-thiophene compounds can also be added to or incorporated with the organic material before or during its shaping. Inter alia, they may be added to the moulding compositions from which films, foils, tapes or mouldings are made or they may be dissolved or finely dispersed in the spinning mass before the latter is spun. The new monoazolyl-thiophene compounds of the composition defined above may also be added to the reaction mixtures before or during the polycondensation leading, for example, to polyesters or polyamides, or before or during the polymerisation of monomers, for example acrylonitrile or vinyl chloride.

The requisite amount of the new monoazolylthiophene compound, referred to the weight of the material to be optically brightened, may vary within wide limits. Even a very small amount, in some cases, for example, as little as 0.01%, may produce a distinct and durable brightening effect. While an amount of more than 3% may in general not prove harmful, it does not offer any advantage over the normal amount either.

The new monoazolyl-thiophene compounds may be used as optical brighteners in the following ways:

(a) In admixture with dyestuffs or as additives to dyebaths, printing, discharge or reserve printing pastes. Also for after-treating dyeings, prints or discharge prints.

(b) In admixture with chemical bleaches or as additives to bleaching baths.

(c) In admixture with dressing agents, such as starch or synthetic dressing agents. The compound of the invention may be added, for example, to a liquor used for producing an anti-crease effect.

(d) In conjunction with detergents. The detergent and the brightener may be added separately to the washing liquor. It is also of advantage to use a detergent of which one ingredient is the brightener. Suitable detergents are, for example, soaps, salts of sulfonate detergents, for example of sulfonated benzimidazoles substituted on the carbon atom 2 by higher alkyl radicals; furthermore salts of monocarboxylic acid esters of 4-sulfophthalic acid with higher fatty alcohols; also salts of fatty alcohol sulfonates, alkylaryl-sulfonic acids or condensation products of higher fatty acids with aliphatic hydroxysulfonic or aminosulfonic acids. Furthermore, there may be used non-ionic detergents, for example polyglycol ethers derived from ethylene oxide and higher fatty alcohols, alkylphenols or fatty amines.

The detergents of the kind referred to above may also contain the usual additives to detergents such as alkali metal carbonates, phosphates, pyrophosphates, polyphosphates, metaphosphates, silicates, perborates or percarbonates, provided the brightening agent is compatible with such additives. It is also possible to manufacture detergents consisting exclusively or predominantly of inorganic compounds having a detergent action and the brightening agent. The mixtures containing the detergent and the optical brightener are obtained by simply mixing and/or grinding the ingredients together; in this connection it may be advantageous to use one or the other ingredient in the dissolved or molten state to facilitate dispersion.

In general a small addition of the optical brightener to the detergent will suffice; there may be used, for example, an amount of 0.1 to 2% referred to the weight of detergent used; also smaller amounts, for example 0.01%, may be added. It is also possible to use mixtures with other known brightening agents.

The detergents are used in the usual washing methods; in this way the materials to be cleaned may be washed and at the same time brightened.

Materials to be optically brightened may be, for example:

A. Textile materials which may be in any desired form, for example in the form of fibers, filaments, yarns, woven or knitted fabrics or felt, as well as any product manufactured therefrom; such textile materials may consist of natural materials of animal origin, such as wool or silk, or of vegetable origin, such as cellulose materials of cotton, hemp, flax, linen, jute, ramie; or of semi-synthetic materials such as regenerated cellulose, for example rayon, viscoses, including spun rayon; furthermore of cellulose esters such as cellulose butyrate and acetylcellulose, also of synthetic materials accessible by polymerization, for example polyacrylonitrile, polyvinyl chloride, polyvinylidene chloride, polyolefines such as polyethylene and polypropylene, or synthetic materials that are accessible by polycondensation, more especially polyesters and polyamides.

B. Other fibrous materials not being textile materials; they may be of animal origin such as feathers, hairs and pelts or hides and leathers made from the latter by natural or chemical tanning, as well as manufactured goods made therefrom; also materials of vegetable origin such as straw, wood, woodpulp or fibrous materials consisting of densified fibrous materials, more especially paper, cardboard or hardboard, as well as finished products made from the latter.

C. Synthetic materials of diverse constitution in the form of powders, films, lacquers, resins or mouldings, consisting for example of acetylcellulose, nitrocellulose, vinyl acetate, polystyrene, polyvinyl chloride, copolymers of vinyl chloride and vinylidene chloride, alkyd resin lacquers, polyolefines, polyacrylonitrile, polyamides, polyesters, epoxy resins, formaldehyde condensation products with phenol, urea or melamine.

When the new brighteners are used in conjunction with other improving agents, for example by one of the methods described above under (a) to (d), it is of advantage to perform such a combined treatment with the aid of a suitable preparation. These stable preparations contain at least one monoazolyl-thiophene compound of the constitution defined above and at least one dispersing agent, detergent, dyestuff, pigment, dressing agent or finely dispersed carrier pigment.

Unless otherwise indicated, parts and percentages in the following examples are by weight.

*Example 1*

37.2 parts of thiophene-2:5-dicarboxylic acid monomethyl ester (prepared according to Example VIIa of U.S. Patent No. 2,680,731 to E. I. du Pont de Nemours and Company, patented June 8, 1954) are heated in 250 parts by volume of chlorobenzene and 30 parts of thionyl chloride with stirring within one hour to 115° C. and then further stirred for one hour at this temperature, during which thiophene-2:5-di-carboxylic acid monomethyl ester chloride forms and a complete solution is obtained. After having expelled the excess thionyl chloride by passing a current of dry air or by distillation under reduced pressure there are added at 20° C. 21.8 parts of 1-amino-2-hydroxybenzene. While being thoroughly stirred the batch is then heated within 1 to 1½ hours to the boil and then refluxed for 3 to 4 hours, whereupon the amide of the formula

(16) 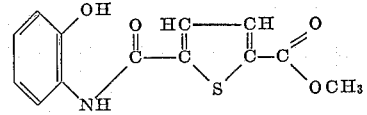

partially precipitates. When hydrochloric acid is no longer being evolved, 50 parts by volume of diethyleneglycol diethyl ether and 2 parts of boric acid are added and the reaction mixture is heated with exclusion of air within 2 to 3 hours to 220° C. while being stirred, the solvent being removed almost completely and the water formed during the reaction being removed through a descending condenser. The reaction mixture is further heated for one hour at 220 to 235° C. and during the following cooling off there are added 100 parts by volume of dioxane and after that 250 parts by volume of methanol. The whole is then cooled to room temperature, the precipitated crystalline 5-[benzoxazolyl-(2')]-thiophene-2-carboxylic acid methyl ester of the formula

(17) 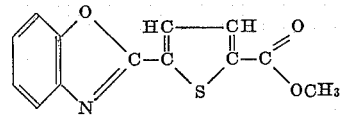

is suctioned off, washed with methanol and dried. Yield: about 41.6 parts (=80.4% of the theoretical) of a light-beige colored, crystalline powder melting at 131 to 133.5° C.

When the filtrate is concentrated to 100 parts by volume and 50 parts of water are added, there are further obtained about 4.8 (=9.2% of the theoretical yield) of a slightly more intensely colored product melting at 134 to 134.5° C. After four recrystallizations from dioxane+water (4:1) with the aid of active carbon there are obtained fine, colorless crystals which melt at 145 to 145.5° C. and display a blue fluorescence in ultraviolet light.

*Analysis.*—$C_{13}H_9O_3NS$ (molecular weight 259.28): Calculated—C, 60.22%; H, 3.50%; N, 5.40%. Found—C, 60.36%; H, 3.55%; N, 5.43%.

The monoazolyl-thiophene compounds described in the following table can be obtained in a similar manner:

| No. | Formula | Yield (crude in percent) | Properties | Analysis Calcul. (mol. wt). | Found |
|---|---|---|---|---|---|
| 18 | (structure with H₃C on benzoxazole) | 78 | Colorless, shiny crystals, M.P., 129.5 to 130° C. (methanol). | C, 61.53<br>H, 4.06<br>N, 5.12<br>(273.31) | C, 61.45<br>H, 4.16<br>N, 5.40 |
| 19 | (structure with H₃C on benzoxazole) | 45.6 | Pale-yellow, shiny small needles, M.P., 123.5 to 124.5° C. (methanol). | C, 61.53<br>H, 4.06<br>N, 5.12<br>(273.31) | C, 61.44<br>H, 3.97<br>N, 4.89 |
| 20 | (structure with H₃C on benzoxazole) | 73.2 | Colorless, shiny flakes, M.P., 132.5 to 133° C. (methanol). | C, 61.53<br>H, 4.06<br>N, 5.12<br>(273.31) | C, 61.72<br>H, 3.94<br>N, 5.17 |

| No. | Formula | Yield (crude in percent) | Properties | Analysis Calcul. (mol. wt). | Found |
|---|---|---|---|---|---|
| 21 | | 76.6 | Colorless crystal powder, M.P., 108 to 108.5° C. (methanol). | C, 61.53<br>H, 4.06<br>N, 5.12<br>(273.31) | C, 61.67<br>H, 4.18<br>N, 4.97 |
| 22 | | 59.2 | Colorless crystal powder, M.P., 97 to 97.5° C. | C, 62.70<br>H, 4.56<br>N, 4.87<br>(287.34) | C, 62.80<br>H, 4.56<br>N, 4.63 |
| 23 | | 83.5 | Colorless, fine crystals, M.P., 84 to 84.5° C. (methanol). | C, 63.77<br>H, 5.02<br>N, 4.87<br>(301.36) | C, 63.97<br>H, 4.99<br>N, 4.78 |
| 24 | | 69.3 | Pale-yellow, fine crystals, M.P., 156° (dioxane-methanol). | C, 62.70<br>H, 4.56<br>N, 4.87<br>(287.34) | C, 62.84<br>H, 4.72<br>N, 4.64 |
| 25 | | 75.4 | Pale-yellow crystal powder, M.P., 127° C. (methanol). | C, 62.70<br>H, 4.56<br>N, 4.87<br>(287.34) | C, 62.70<br>H, 4.45<br>N, 4.74 |
| 26 | | 50.8 | Colorless fine crystals, M.P., 87 to 87.5° C. (methanol). | C, 63.77<br>H, 5.02<br>N, 4.65<br>(301.36) | C, 63.48<br>H, 4.94<br>N, 4.38 |
| 27 | | 75.1 | Colorless, very fine needles, M.P., 129.5 to 130° C. (methanol). | C, 64.74<br>H, 5.43<br>N, 4.44<br>(316.39) | C, 64.93<br>H, 5.18<br>N, 4.48 |
| 28 | | 62.5 | Colorless, very fine needles, M.P., 135.5 to 136° C. (methanol). | C, 67.90<br>H, 6.78<br>N, 3.77<br>(371.50) | C, 67.91<br>H, 6.68<br>N, 3.80 |
| 29 | | 46.4 | Colorless, shiny needles and flakes, M.P., 126.5 to 127.5° C. (methanol). | C, 70.00<br>H, 5.07<br>N, 3.71<br>(377.46) | C, 69.86<br>H, 5.06<br>N, 3.86 |
| 30 | | 85.7 | Pale-yellow, crystal powder, M.P., 125 to 125.5° C. (ethanolmethanol). | C, 68.75<br>H, 4.33<br>N, 4.01<br>(349.41) | C, 68.78<br>H, 4.26<br>N, 3.87 |
| 31 | | 72 | Almost colorless, shiny flakes, M.P., 146° C. (methanol). | C, 66.84<br>H, 5.61<br>N, 4.10<br>(341.43) | C, 67.04<br>H, 5.60<br>N, 4.06 |

| No. | Formula | Yield (crude in percent) | Properties | Analysis Calcul. (mol. wt). | Found |
|---|---|---|---|---|---|
| 32 | 5-phenyl-benzoxazolyl thiophene carboxylic acid methyl ester (structure) | 83.5 | Pale-yellow, very fine needles, M.P., 189 to 189.5° C. (tetrachlorethylene). | C, 68.04<br>H, 3.91<br>N, 4.18<br>(335.38) | C, 68.08<br>H, 3.93<br>N, 4.43 |
| 33 | 5-methoxy-benzoxazolyl thiophene carboxylic acid methyl ester (structure, H₃CO-) | 94.4 | Light-yellow, crystal powder, M.P., 137.5 to 138° C. (methanol). | C, 58.12<br>H, 3.83<br>N, 4.84<br>(289.32) | C, 57.90<br>H, 3.56<br>N, 4.57 |
| 34 | 5-chloro-benzoxazolyl thiophene carboxylic acid methyl ester (structure, Cl-) | 84 | Colorless, shiny, very fine crystals, M.P., 167.5 to 168° C. (methanol). | C, 53.16<br>H, 2.75<br>N, 4.77<br>(293.73) | C, 52.99<br>H, 2.68<br>N, 4.56 |
| 35 | methoxycarbonyl-benzoxazolyl thiophene carboxylic acid methyl ester (structure, H₃COOC-) | 89 | Colorless, crystal powder, M.P., 237.5° C. (dioxane). | C, 56.78<br>H, 3.49<br>N, 4.41<br>(317.33) | C, 56.89<br>H, 3.65<br>N, 4.43 |
| 36 | tetrahydro-naphth-oxazolyl thiophene carboxylic acid methyl ester (structure) | 79.2 | Pale-yellow, fine crystals, M.P., 137.5 to 138° C. (methanol). | C, 65.16<br>H, 4.82<br>N, 4.47<br>(313.38) | C, 65.35<br>H, 5.03<br>N, 4.56 |
| 37 | naphth-oxazolyl thiophene carboxylic acid methyl ester (structure) | 90.2 | Light-yellow, very fine needles, M.P., 184 to 184.5° C. (dioxane). | C, 66.01<br>H, 3.58<br>N, 4.53<br>(309.34) | C, 66.12<br>H, 3.54<br>N, 4.33 |
| 38 | benzothiazolyl thiophene carboxylic acid methyl ester (structure) | 92.3 | Pale-yellow, slightly felted, fine needles, M.P., 150 to 151° C. (dioxane). | C, 56.71<br>H, 3.29<br>N, 5.09<br>(275.35) | C, 56.92<br>H, 3.55<br>N, 5.17 |

Example 2

29.5 parts of 5-[benzoxazolyl (2')]-thiophene-2-carboxylic acid methyl ester are dissolved at 60° C. in 250 parts by volume of dioxane. While stirring this solution well, 300 parts by volume of a 10% aqueous sodium hydroxide solution heated at 60° C. are added, and the reaction mixture is stirred for another 2 hours at 60 to 65° C., then cooled to room temperature, diluted with 1500 parts of water and rendered acid to Congo red with hydrochloric acid. After suctioning, washing with water and drying there are obtained about 23.2 parts (=94.7% of the theoretical yield) of 5-[benzoxazolyl-(2')]-thiophene-2-carboxylic acid of the formula (39)

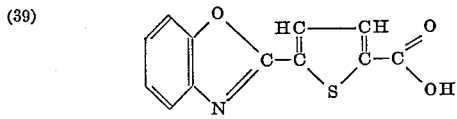

in the form of an almost colorless powder. After three recrystallizations from dioxane+water (1:1) an almost colorless, finely crystalline powder melting at 245 to 246° C. is obtained.

Analysis.—$C_{12}H_7O_3NS$ (molecular weight 245.25): Calculated—C, 58.77%; H, 2.88%; N, 5.71%. Found—C, 59.15%; H, 2.91%; N, 5.54%.

Example 3

51.8 parts of 5-[benzoxazolyl-(2')]-thiophene-2-carboxylic acid methyl ester are dissolved with heating in 400 parts by volume of dioxane; 50 parts of hydrazine hydrate are added, and the reaction mixture is stirred and refluxed for 15 hours, whereupon 5-[benzoxazolyl-(2')]-thiophene-2-carboxylic acid hydrazide of the formula (40)

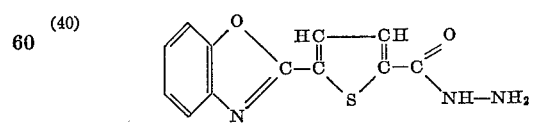

gradually settles out in the form of fine needles. The reaction mixture is diluted with 200 parts by volume of methanol, cooled to about 5° C., suctioned off and the filter residue is washed with 250 parts by volume of methanol cooled at 5° C. After drying, there are obtained about 45.8 parts (=88.5% of the theoretical yield) of pale-yellow, fine needles melting at 250.5 to 251° C.

Analysis.—$C_{12}H_9O_2N_3S$ (molecular weight 259.29): Calculated—C, 55.59%; H, 3.50%; N, 16.21%. Found—C, 55.58%; H, 3.60%; N, 16.33%.

In a similar manner 5-[5'-methyl-benzoxazoyl-(2')]-thiophene-2-carboxylic acid hydrazide of the formula

(41) 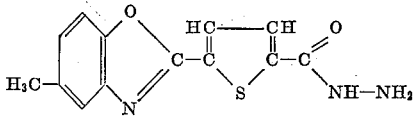

can be obtained in a yield of about 78% of the theoretical. After three recrystallizations from xylene with the aid of active carbon the product forms pale-yellow, felted needles melting at 221° C.

*Analysis.*—$C_{13}H_{11}O_2N_3S$ (molecular weight 273.31). Calculated—C, 57.13%; H, 4.06%; N, 15.37%. Found—C, 57.26%; H, 4.01%; 15.30%.

Example 4

A mixture of 12.2 parts of 5-[benzoxyzolyl-(2')]-thiophene-2-carboxylic acid, 150 parts by volume of chlorobenzene and 30 parts of thionyl chloride is stirred and refluxed for 5 hours. The excess thionyl chloride is then distilled off and the colorless reaction solution is cooled, mixed with 5 parts of aniline and refluxed for 1½ hours. After cooling, the reaction product is suctioned off, washed with benzene and dried, to give a yield of about 13.0 parts (=81.2% of the theoretical) of 5-[benzoxazolyl-(2')]-thiophene-2-carboxylic acid anilide of the formula

(42) 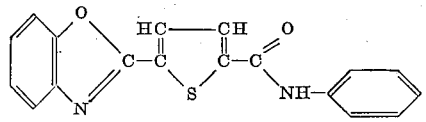

in the form of an almost colorless powder which melts at 237 to 237.5° C. After three recrystallizations from dioxane+ethanol+water with the aid of active carbon, colorless, very fine needles melting at 239.5° C. are obtained.

*Analysis.*—$C_{18}H_{12}O_2N_2S$ (molecular weight 320.37): Calculated—C, 67.48%; H, 3.78%; N, 8.74%. Found—C, 67.35%; H, 4.04%; N, 8.49%.

Example 5

100 parts of a polyamide fabric, for example spun nylon, are immersed at 60° C. in a bath consisting of
4000 parts of water,
4 parts of a dispersant (adduct from 35 mols of ethylene oxide with 1 mol of octadecyl alcohol),
4 parts of 40% acetic acid and
0.5 part of the benzoxazolyl-thiophene compound of the Formula 17

The bath is then heated within 20 minutes to the boil and the fabric is treated at the boil for 30 minutes, then rinsed and dried.

The polyamide fabric treated in this manner has a substantially higher white content than the untreated fabric.

Similar brightening effects are achieved by replacing the compound of the Formula 17 by one of the compounds of the Formulae 20, 27, 29, 31 or 34.

When, instead of the polyamide fabric used above, a polyester fabric is treated in the absence of acetic acid but otherwise in identical manner, a good brightening effect is likewise obtained.

What is claimed is:

1. A monoazolyl-thiophene compound of the formula

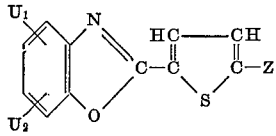

where $U_1$ is a member selected from the group consisting of hydrogen, halogen, lower alkyl, lower alkoxy, cyclohexyl, phenyl, phenyl(lower) alkyl and carbo (lower) alkoxy, $U_2$ is a member selected from the group consisting of hydrogen and lower alkyl and Z is a member selected from the group consisting of (a) 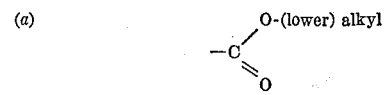

(b) 

(c) 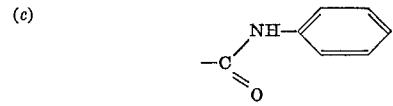

(d) 

2. The compound of the formula

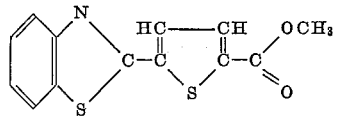

3. The compound of the formula

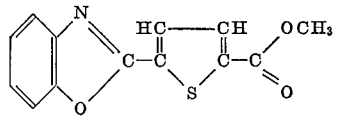

4. The compound of the formula

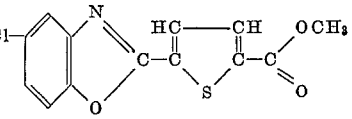

5. The compound of the formula

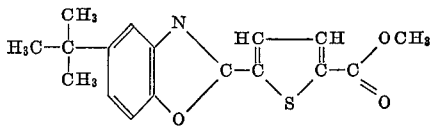

6. The compound of the formula

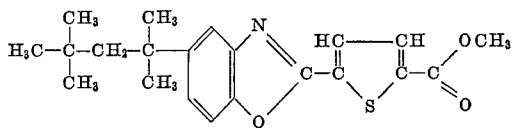

7. The compound of the formula

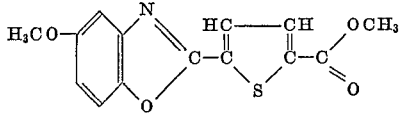

8. The compound of the formula

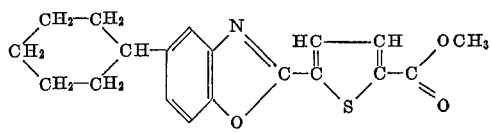

9. The compound of the formula

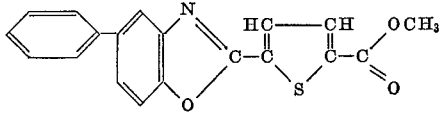

10. The compound of the formula
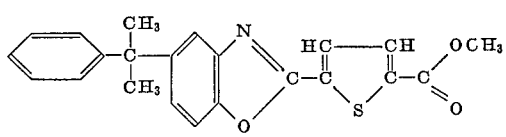
11. The compound of the formula
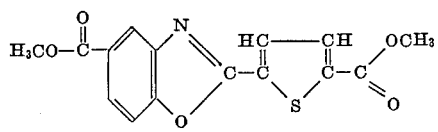
12. The compound of the formula
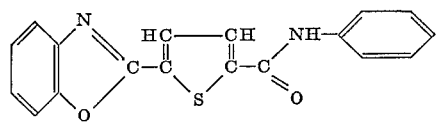
13. The compound of the formula
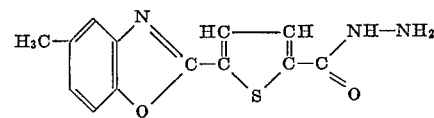
14. The compound of the formula
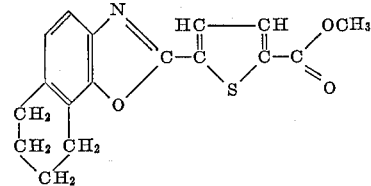
15. The compound of the formula
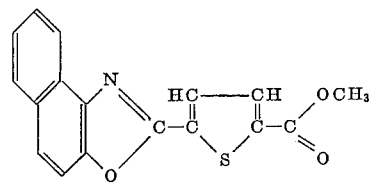
References Cited by the Examiner
UNITED STATES PATENTS
2,737,516  3/1956  Sartori _____ 260—307.4
2,985,661  5/1961  Hein et al. _____ 260—307.4
FOREIGN PATENTS
211,167  10/1957  Australia.
ALEX MAZEL, *Primary Examiner.*
ALTON D. ROLLINS, *Assistant Examiner.*